Patented June 20, 1933

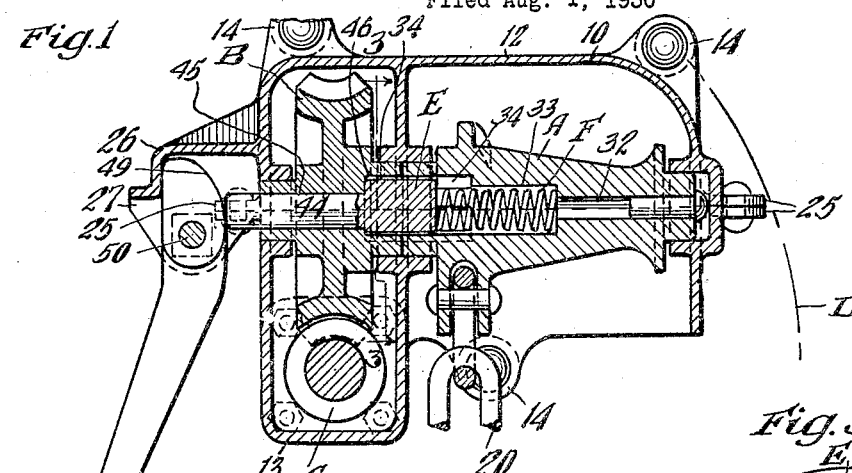

1,914,566

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

CLUTCH

Application filed August 1, 1930. Serial No. 472,217.

This invention relates to improvements in clutches.

One object of the invention is to provide a simple and efficient clutch, especially adapted for use in connection with hand brake mechanism of the power-multiplying type for railway cars, for operatively connecting the driving and winding mechanism and so designed as to facilitate easy releasing action.

A more specific object of the invention is to provide in a clutch for a hand brake mechanism including a rotary chain winding drum member and rotary manually actuated operating means, a releasable rotary sliding clutch element for operatively connecting the actuating means and drum, wherein the clutch element has shouldered engagement with the part driven thereby on faces substantially radial to the axis of rotation of the clutch element, thereby preventing binding of the clutch due to the tension produced by the tightened brake chain.

Other objects of the invention will more clearly appear from the description and claims hereinafter following.

In the drawing, forming a part of this specification, Figure 1 is a vertical, sectional view of a hand brake mechanism showing the same applied to the vertical end wall of a railway car and illustrating my improved clutch in connection therewith, said section being in a plane parallel to said end wall. Figure 2 is an end elevational view of the hand brake mechanism illustrated in Figure 1, looking from the left in said figure, the end wall of the car being shown in vertical section. Figure 3 is a vertical sectional view, on an enlarged scale, of the clutch mechanism proper and cooperating parts, corresponding substantially to the line 3—3 of Figure 1. Figure 4 is a detailed perspective view of the sliding clutch member employed in connection with my improved hand brake mechanism. And Figure 5 is an enlarged sectional view of a modified form of my improved clutch mechanism as applied to the type of hand brake illustrated in Figures 1 and 2.

Referring first to the embodiment of the invention illustrated in Figures 1 to 4 inclusive, the operating parts of the hand brake mechanism are shown as mounted within a housing 10, which is secured to the vertical end wall of the car, indicated by 11. The housing 10 comprises top and bottom sections 12 and 13. The section 13 is provided with a depending lug member 14 and the top section 12 is provided with a pair of upstanding lug members, also indicated by 14, the lugs 14 of the top and bottom sections serving to secure the hand brake mechanism and particularly the housing to the vertical end wall of the car, rivets or any other suitable securing means being employed for this purpose. The housing is open at the bottom so as to accommodate the brake chain 20 for movement. The brake chain, as will be understood, is operatively connected to the brake mechanism proper of the railway car in the usual manner, not shown. At opposite sides, the two sections of the housings are provided with outstanding flanges 25—25 at their meeting edges by which the same are secured together, rivets being employed which extend through these flanges.

At the left-hand side, as viewed in Figure 1, the upper section 12 of the housing is provided with a supporting bracket portion 26 having a top wall and spaced side walls forming a fork member 27.

The hand brake mechanism proper, as illustrated in Figures 1 to 4 inclusive, comprises broadly a chain-winding drum A; a worm wheel B in axial alignment with the drum; a worm C meshing with the worm wheel B; and a hand wheel D for rotating the worm C.

My improved clutch means comprises a sliding clutch element E having engagement with the drum A and worm wheel B, a spring F, and an actuating lever G.

As most clearly shown in Figure 1, the drum A has an axial opening therethrough which has a portion 32 of relatively small diameter and a portion 33 of larger diameter. At the left-hand end portion of the opening 33, the drum is provided with a plurality of axially extending radial slots 34—34, the slots being preferably three in number, as clearly shown in Figure 3.

In order to connect the chain winding drum A and the worm wheel B for rotation in unison when the chain is being tightened, I provide the sliding clutch means which includes the clutch element E. The clutch element E is in the form of a generally cylindrical member having a projecting stem 44 of smaller diameter, which is slidably supported in an axial opening 45 in the hub of the worm wheel B. At the righthand end of the hub, the worm wheel B as shown in Figure 1, is provided with a pocket 46 of larger diameter than the opening 45, which pocket accommodates the larger portion of the clutch member E. The pocket is provided with a plurality of radial slots, preferably three in number, which are broadly similar to the slots 34 of the chain winding drum A, hereinbefore described, and are also indicated by 34. The slots 34 of the chain winding drum A and the worm wheel B are so spaced that they will register when the elements A and B are relatively rotated to the proper extent. The clutch element E has three relatively thick radially disposed projections or ribs 47—47 which are adapted to slide within the openings 34—34 of the worm wheel B and chain winding drum A. As most clearly shown in Figure 4, the projections or fingers 47—47 of the clutch element have the longitudinally extending side faces thereof disposed substantially radial to the axis of the clutch member and have beveled or wedge shaped engaging portions 48—48 at the inner ends thereof, so as to facilitate engagement of the clutch fingers within the clutch openings 34 of the worm wheel B. The clutch member E is held in the normal position, shown in Figure 1, by means of the clutch spring F, which is disposed within the opening 33 of the chain winding drum A and has its opposite ends bearing respectively on the bottom of said opening and the end face of the clutch member E. The stem 44 of the clutch member is of such a length that it normally protrudes beyond the wall of the housing as shown in Figure 1.

The clutch is actuated by the clutch lever G, which has a cam head 49 at the inner end thereof bearing on the projecting end of the stem 44, the lever G being pivotally supported by a bolt 50 extending through the cam head portion thereof and having its opposite ends mounted in the forked portion 27 of the supporting bracket of the housing.

In a chain tightening operation, in applying the brakes, the clutch element E is in the position shown in Figure 1, wherein the clutch projections or fingers 47—47 are in clutching engagement with both the slots of the worm wheel and the chain winding drum, the same being yieldingly held in that position by means of the clutch spring F. To tighten the brakes, the hand wheel D, which is indicated in dotted lines in Figure 1, is rotated in a clockwise direction, as viewed in said figure, thereby actuating the worm which meshes with the worm wheel B and drives the latter. Inasmuch as the worm wheel B is at this time clutched to the chain winding drum A, the latter will be rotated, thus winding the chain thereon. Backward rotation of the hand wheel at this time is prevented due to the amount of friction existing between the cooperating threads or teeth of the worm wheel and worm. In order to release the brakes and permit unwinding of the chain, the operating lever G is pulled to the left, as viewed in Figure 1, thereby camming the clutch member E inwardly against the tension of the spring F and disengaging the clutch projections or fingers 47 from the slots of the worm wheel B, sufficient clearance being provided at the righthand end of the slots 34 of the chain winding drum, as viewed in Figure 1, to permit of this movement. As will be evident, when the clutch is thus released, the chain winding drum A is free to rotate with respect to the worm wheel and other parts of the winding mechanism, thereby permitting free running of the chain winding drum and quick release of the brakes without imparting rotation to the other operating parts. As will be evident, the hand wheel thus remains stationary during the chain unwinding operation, thereby protecting the brakeman against injury. When the brakes are completely released, the operating handle G will return to its original position by the action of gravity and the spring F, which is under compression, quickly returns the clutch to its normal position, as shown in Figure 1, whereby clutching engagement is again established. In case the slots 34—34 of the chain winding drum A and worm wheel B are not in exact alinement when the chain winding drum A comes to rest when the brakes are released, a slight rotation of the parts at the beginning of the chain winding operation will rotate the gear B with respect to the drum A, thereby bringing the slots in alinement and permitting the clutch member E to re-engage the clutch slots of the worm wheel B. The beveled or wedge shaped ends 48—48 of the clutch projections 47 facilitate the re-engagement of the parts, guiding the fingers or projections into the slots of the worm wheel B.

As will be obvious, the brake mechanism may be backed off or eased up when desired, by rotation of the hand wheel in a contra-clockwise direction, as viewed in Figure 1, while the chain winding drum is clutched to the worm wheel.

Referring next to the modification illustrated in Figure 5, all of the parts of the brake mechanism are substantially the same as that shown in Figures 1 to 4 inclusive, with the exception of the particular clutch means. The brake mechanism is worm driven and is mounted within a housing similar to the housing hereinbefore described. The chain winding drum, which is indicated by A′, is of similar design to the drum A and has a spring F′ mounted therein which cooperates with the clutch member E′, which is slidable within an axial opening 60, of square cross section provided at the lefthand end of the hub portion of the chain winding drum A′, as viewed in Figure 5. The worm wheel, which is in all respects similar to the worm wheel B, is indicated by B′ and has a pocket 61 therein which is in alinement with the opening 60 of the chain winding drum A′ and is provided with a plurality of slots 134—134, preferably four in number, and corresponding to the slots 34 hereinbefore described in connection with the worm wheel B. The clutch member, which is indicated by E′ is operated in the same manner as the clutch member E and has a stem 144 which is engaged by a cam lever similar to the lever G, hereinbefore described, for moving the clutch member inwardly or to the right, as viewed in Figure 5. The clutch member E′ has a portion of square cross section 62 which slidably fits the square opening 60 of the drum A′. At the lefthand end, the clutch member E is provided with four clutch projections or teeth 147 which correspond to the teeth 47 of the clutch member E hereinbefore described, the tooth 147 also having beveled ends for facilitating engagement within the clutch slots of the worm wheel B′.

The operation of the clutch means illustrated in Figure 5 is precisely the same as the operation of the clutch member E.

I have herein shown and described what I now consider the preferred manner of carrying out my invention, but the same is merely illustrative and I contemplate all changes and modifications that come within the scope of the claims appended hereto.

I claim:

1. In a clutch mechanism, the combination with a rotary element; of a manually actuated rotary operating element, said elements having aligned axial openings provided with interior clutch projections; releasable manually actuated clutch means operatively connecting said elements, said clutch means including a rotary member coaxial with said openings and slidable within said openings, said member having an axial stem extending through one of said elements and projecting beyond the same, said member also having clutch projections simultaneously engageable with the projections of both elements, said clutch projections of said member and the projections of said elements having radially disposed engaging faces; and a lever having cam means thereon engageable with said projecting portion of the stem for actuating said clutch means.

2. In a clutch mechanism, the combination with a rotary driven member; of a manually actuated rotary driving member for operating said first named member, said members having aligned axial pockets provided with internal clutch projections, one of said members having an axial bore communicating with the pocket thereof; a releasable clutch element comprising a clutch head and a central cylindrical stem, said head and stem being coaxial with said pockets and said stem extending through said axial bore, said element being axially slidable within one of said members and having peripheral projections on the head thereof engaging the clutch projections of said last named member, said clutch element being reciprocable to either engage the clutch projections thereof with the clutch projections of the other member or disengage the same therefrom; and means engaging the outer end of the stem for reciprocating said element.

3. In a clutch mechanism, the combination with a rotary driven member; of a manually actuated rotary member for operating said first named member, said members having aligned axial openings provided with internal clutch projections, one of said members having an axial pocket communicating with the opening thereof, and the other member having an axial bore communicating with the opening thereof; a releasable clutch element operatively connecting said rotary members, said element having a stem and a head, said head being accommodated within the opening of the member which has the axial bore, said stem of the clutch element being slidable within said bore, said head being axially slidable within the opening of one of said members and having peripheral projections engaging the clutch projections of said last named member; spring means for forcing said clutch element into the opening of the other member in interengaging relation with the clutch projections thereof; and manually actuated means for disengaging said element from said last named member.

4. In a clutch mechanism, the combination with a rotary driven element; of a rotary actuating element, said elements being in axial alignment and having aligned axial openings provided with interior clutch projections; a clutch member provided with a head and stem, said clutch member being slidable axially of said elements and having the head thereof provided with peripheral longitudinal ribs slidably engaging the projections of both of said elements, said ribs and projections of said member and elements having shouldered engagement on faces radial to the axis of rotation thereof; and lever operated cam means engaging the stem of said clutch member for sliding said clutch member axially of said elements to disengage the ribs from one of said elements.

In witness that I claim the foregoing I have hereunto subscribed my name this 29th day of July 1930.

STACY B. HASELTINE.